United States Patent
Kraus et al.

(10) Patent No.: US 6,576,042 B2
(45) Date of Patent: Jun. 10, 2003

(54) PROCESS CONTROL METHOD TO INCREASE DEAERATION CAPACITY IN AN ECR BY CONSTANT VOLTAGE OPERATION

(75) Inventors: Robert P. Kraus, Rochester, NY (US); Steven D. Possanza, Penfield, NY (US); Roland J. Koestner, Penfield, NY (US); Kim E. Goppert, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/950,487

(22) Filed: Sep. 11, 2001

(65) Prior Publication Data
US 2003/0047067 A1 Mar. 13, 2003

(51) Int. Cl.[7] .............................................. B01D 19/00
(52) U.S. Cl. ............................................ 95/30; 96/175
(58) Field of Search ................................ 95/30; 96/175

(56) References Cited

U.S. PATENT DOCUMENTS

| | | | |
|---|---|---|---|
| 2,620,894 A | * | 12/1952 | Peterson et al. |
| 3,429,743 A | * | 2/1969 | Branson |
| 3,432,691 A | | 3/1969 | Shoh |
| 3,904,392 A | | 9/1975 | VanIngen et al. |
| 4,070,167 A | * | 1/1978 | Barbee et al. |
| 4,398,925 A | * | 8/1983 | Trinh et al. |
| 5,276,376 A | * | 1/1994 | Puskas |
| 5,373,212 A | | 12/1994 | Beau |
| 5,508,975 A | * | 4/1996 | Walter |
| 5,853,456 A | | 12/1998 | Bryan et al. |

* cited by examiner

Primary Examiner—Duane S. Smith
(74) Attorney, Agent, or Firm—Mark G. Bocchetti

(57) ABSTRACT

A method is taught for debubbling a liquid composition containing entrained gas bubbles that increases the effectiveness of ultrasonic debubbling apparatus employed. The method comprises the steps of immersing an ultrasonic horn in water, the horn being contained within a vessel and coupled to a pair of transducers; adjusting an RF generator connected to the pair of transducers to produce a signal at or near a parallel resonance frequency of the pair of transducers; fixing the RF generator at a constant voltage level; and flowing the liquid composition to be debubbled through the vessel with the RF generator operating at constant voltage level and at a variable operating power level that varies with the viscosity of the liquid composition.

11 Claims, 4 Drawing Sheets

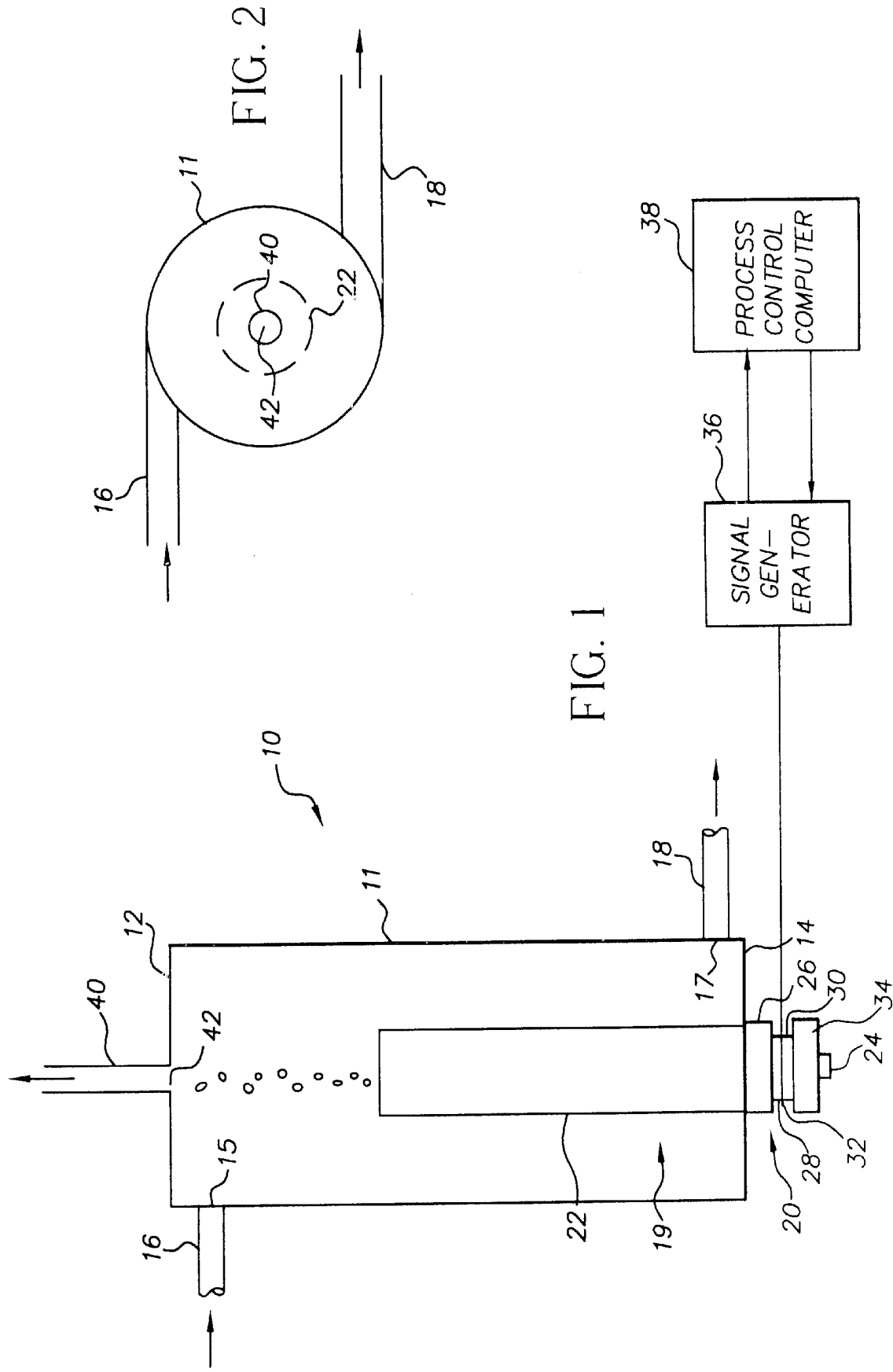

PROCESS CONTROL METHOD TO INCREASE DEAERATION CAPACITY IN AN ECR BY CONSTANT VOLTAGE OPERATION

FIELD OF THE INVENTION

The present invention relates generally to methods and apparatus for removing entrained gas bubbles from a liquid and; more particularly to methods and apparatus for dissolving and separating entrained gas bubbles in a moving stream of a liquid by exposing the liquid to an ultrasonic field; and most particularly to a method for increasing the effectiveness of ultrasonic debubbling apparatus.

BACKGROUND OF THE INVENTION

There are a variety of emulsions, suspensions, pastes, and high viscosity liquids used in the manufacture of or which become part of a variety of products in the chemical, pharmaceutical, food product, and photographic industries. These emulsions, suspensions, pastes, and high viscosity liquids often contain entrained air or gases present in the form of small bubbles. Often this air or gas, particularly in the case of entrained bubbles, is detrimental to the final product being produced. For example, in the case of photographic emulsions containing bubbles, the quality of the films or photographic papers produced is greatly impaired, giving rise to coated defects making the photographic materials unusable.

It is known to remove gas bubbles from solutions, emulsions, and other liquid compositions by exposing them to an imposed ultrasonic energy field. In such a field, large entrained gas bubbles are caused to coalesce and rise into a gas trap. Small bubbles may be collapsed and the gas driven into solution, depending upon the size of the bubble and the degree of gas saturation of the liquid composition. Apparatus for debubbling generally includes a metal vessel or tube containing a metal horn extending through an end wall of the vessel; one or more crystal transducers resonantly responsive to an imposed ultrasonic RF signal and bonded and/or bolted to the external end of the horn; and an RF signal generator of the proper frequency. Typically, debubbling apparatus in the art of preparing photographic emulsions are operated at ultrasonic frequencies between 25 kHz and 40 kHz.

An apparatus which is typically used in the photographic industry for de-bubbling photographic emulsions is an end cap round ultrasonic bubble eliminator, typically referred to as an ECR. The ECR includes a transducer horn assembly (hereinafter referred to as a "THA") which is an electromechanical device that converts electrical vibration to mechanical vibration. One particular ECR, with its component THA, is taught in U.S. Pat. No. 5,373,212 to Beau, hereby incorporated herein by reference. In the operation of an ECR, an alternating voltage is applied to a ceramic disc of the THA, which, as a result, generates mechanical vibration. This mechanical vibration assists in the debubbling of the photographic emulsions flowing through the ECR. Beau teaches a debubbling device wherein an ultrasonic power supply regulates power output to a predetermined constant level. The output of the generator is automatically adjusted to maintain a nominal power level, for example, 40 watts, in the face of changing load conditions that would otherwise cause the power to change in the absence of this feature. This is referred to in the prior art as a "constant power" setting of the generator.

U.S. Pat. No. 5,853,456 to Bryan et al, hereby incorporated herein by reference, discloses a debubbling device suitable for use in debubbling photographic compositions.

U.S. Pat. No. 3,432,691 to Shoh discloses an ultrasonic generator capable of operation at the parallel resonant frequency of an ultrasonic transducer.

Many delivery systems for delivering photographic compositions from a holding vessel to a coating station are equipped with inline devices for determining the presence of bubbles in the composition. Such a device is commonly known as a "bubble detector" (BD), and the BD alarm signal is known as "bubble detector activity" (BDA). The intensity or frequency of the alarm signal is generally proportional to the size and/or number of bubbles passing through the BD and thus is an accepted measure of the relative effectiveness of a bubble elimination device (BED) upstream of the BD.

Because the removal of bubbles from flowing liquids can be critical to the quality of the products made with such liquids and the speed at which such products can be made, increasing the effectiveness of a bubble elimination device is always desirable.

SUMMARY OF THE INVENTION

It is therefore an object of the present invention to provide a method for increasing the effectiveness of a bubble elimination device in removing entrained bubbles from a flowing stream of liquid composition.

A further object of the present invention is to operate an ultrasonic bubble elimination device in accordance with an improved method to maximize debubbling capacity across a range of changing compositions.

Yet another object of the present invention is to provide a method and apparatus that is useful in providing bubble-free flow of liquid compositions, and especially for enabling the formation of uniform coatings of liquid compositions on moving webs.

Still a further object of the present invention is to provide a method for operating a debubbling apparatus wherein the debubbling apparatus will not suffer damage if operated without liquid present.

Briefly stated, the foregoing and numerous other features, objects and advantages of the present invention will become readily apparent upon a review of the detailed description, claims and drawings set forth herein. These features, objects and advantages are accomplished by operating an ultrasonic bubble eliminator at a constant output voltage at or near the parallel resonant frequency of the eliminator's transducer as opposed to prior art bubble eliminators that are generally operated at constant power output. One benefit of operating at constant voltage, rather than constant power, is that the power dissipated in the transducer remains essentially constant, while the power transferred to the load may vary over a wide range. Thus, the apparatus is able to respond automatically to large changes in load. A second benefit is that the power to the transducer is automatically reduced when the load is removed from the ultrasonic horn, e.g., when the vessel is empty and the horn is coupled to air. High power applied to a horn without load can lead to damage or destruction of the transducer and/or horn.

In the apparatus used to practice the method of the present invention, an ultrasonic debubbler is connected to a variable-frequency RF generator capable of operating at or near the parallel resonance frequency of the debubbler transducer and at constant voltage. In the practice of the method, the debubbler is filled with degassed water and the generator is tuned to or near the parallel frequency of the transducer, typically about 40 kHz. Then the generator and debubbler are jointly calibrated to operate at a constant output voltage (preferably between about 200 volts and 400 volts) at a predetermined power (preferably from about 20 watts to about 40 watts) at a minimum ultrasonic load with the horn immersed in the degassed water. After establishing these settings, the debubbler is placed in service by being coupled inline into a delivery system for liquid composition, and the generator is operated at the established voltage setting. The power delivered to the transducer and horn is then spontaneously varied by the generator in proportion to the ultrasonic load on the debubbler. Experiments have shown such operation at constant voltage to be superior to prior art operation at constant power in removing bubbles from a flowing composition. The present invention is especially useful in the preparation of photographic emulsions for coating.

BRIEF DESCRIPTION OF THE DRAWINGS

FIG. 1 is a schematic drawing of an exemplary ultrasonic debubbling system that may be used in the practice of the method of the present invention.

FIG. 2 is a top plan view of the debubbler vessel shown in FIG. 1.

DETAILED DESCRIPTION OF THE INVENTION

Figure 3:
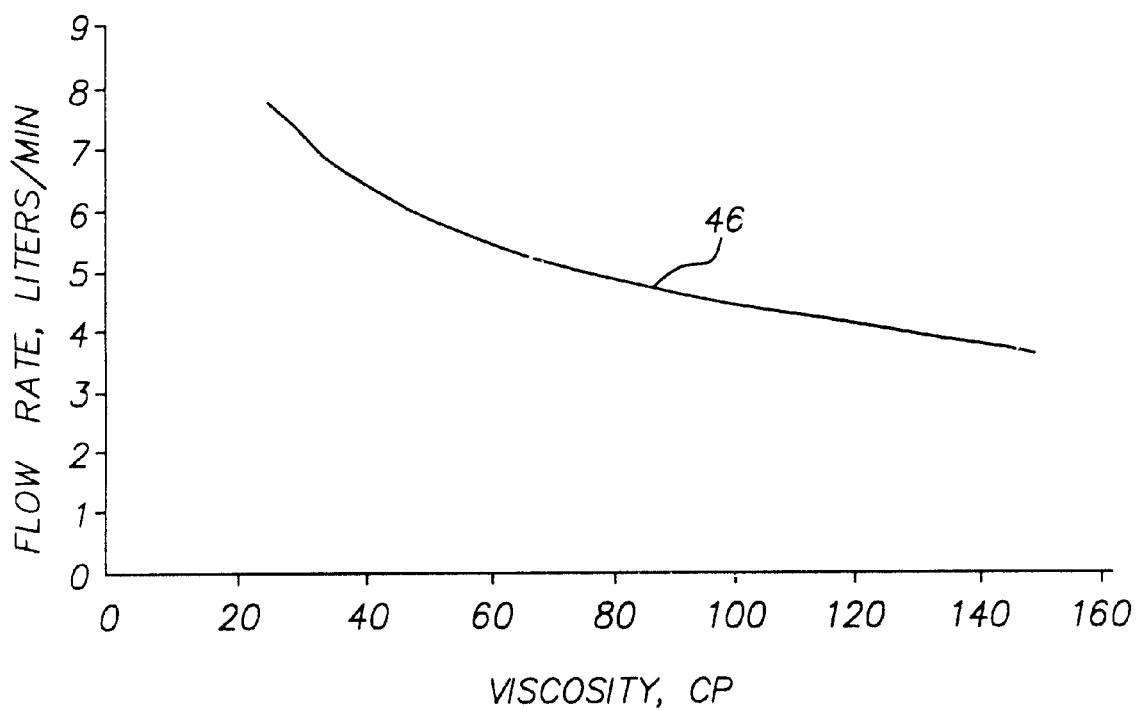
FIG. 3 is a is a graph showing the maximum flow rate of bubble-free delivery for a range of composition viscosities over a range of flow rates through a typical ultrasonic debubbler when operated in accordance with the prior art at constant power, each composition containing the same predetermined amount of entrained air bubbles.

Turning first to FIG. 1, there is schematically depicted a debubbling apparatus 10 for removing bubbles from a flowing stream of a liquid composition. The apparatus 10 comprises a generally cylindrical vessel 11 arranged such that its longitudinal axis is vertically oriented, the vessel 11 being closed at the top and bottom by respective upper and lower end walls 12, 14. There is an inlet port 15 from which a horizontal inlet pipe or conduit 16 extends generally tangentially (see FIG. 2) with respect to the cylindrical wall of the vessel 11. Thus, the longitudinal axis of the inlet conduit 16 is substantially offset laterally with respect to the vertical central axis of the vessel 11. There is an outlet port 17 from which a horizontal outlet conduit 18 extends substantially tangentially with respect to the cylindrical wall of the vessel 11. It will be appreciated that with the arrangement illustrated in FIG. 2, the supply of liquid to the vessel 11, via the inlet conduit 16 at any appreciable rate, will result in the liquid within the vessel 11 having a spin imparted thereto which is clockwise about the vertical axis as viewed in FIG. 2. That is to say, given a net flow from the inlet conduit 16 to the outlet conduit 18 through the vessel 11, the liquid proceeds in a spiraling movement from the upper to the lower end of the vessel 11. As illustrated, the disposition of the outlet conduit 18 with respect to the spin induced by the supply of liquid via the inlet conduit 16 is such that the liquid in the vessel 11 in the region of the outlet port 17 has a substantial component of motion along the axis of the outlet conduit 18 in the direction of the discharge through the outlet conduit 18 and thus tends to maintain the spin of liquid within the vessel 11. However, the orientation of the outlet conduit 18 is not of great importance and it may extend radially or in any other direction.

A device 19 is provided for propagating an ultrasonic beam axially within the vessel 11. The device 19 comprises a transducer portion 20 below end wall 14 and an ultrasound-conducting and propagating member 22 of solid cylindrical form in the present embodiment but referred to herein, for convenience, as a "horn", extending axially within the vessel from the bottom end wall 14. The horn 22 may, for example, comprise a cylindrical metal bar of predetermined length having a flat upper end face perpendicular to the common axis of horn 22 and the vessel 11. The horn 22 has a screw-threaded axial passage (not shown) extending from its lower end for receiving a securing bolt 24 (the head of which is visible in FIG. 1), passed through a central hole in the lower end wall 14, and passing through an axial passage provided in the stack of components forming the transducer portion 20. The bottom end wall 14 is thus clamped by the bolt 24 between the lower end face of the horn 22 and the transducer portion 20, whereby the aperture in the end wall 14 is sealed against passage of liquid or air and the device 19 is mechanically secured to the end wall 14. The transducer 20 is based upon the Langevin sandwich and comprises a first annular end mass 26 below the lower end wall 14, a first annular piezoelectric crystal 28 below end mass 26, an annular contact plate 32 disposed between piezoelectric crystal 28 and a second annular piezoelectric crystal 30 matched with piezoelectric crystal 28 and a second annular end mass 34 disposed below piezoelectric crystal 30. It should be understood that Supplemental Pair(s) of piezoelectric crystals can be added to the stack to yield more than one transducer. The contact plate 32 is electrically connected to a tunable RF signal generator 36 providing an a.c. electrical signal (e.g. of 40 kHz). The ultrasonic signal generator 36 may be controlled by an optional process control computer 38. The horn 22 and the components of the transducer portion 20 are selected and dimensioned to afford efficient conversion of electrical energy supplied to the transducer portion 20 to ultrasonic energy propagated upwardly, axially in the vessel 11 from the flat upper end face of the horn 22 at the selected ultrasonic operating frequency of the device. The end wall 14 is constructed as a flexible metal diaphragm (typically corrugated) to accommodate ultrasonic vibrations in the vertical sense imparted to the lower face of the horn 22 and thus to the central portion of the wall 14 by the transducer portion 20. A vent purge conduit 40 extends axially from an outlet vent purge port 42 located centrally in the top end wall 12 of the vessel 11.

In operation of the apparatus, liquid to be debubbled is supplied to the vessel 11 via inlet conduit 16 from a supply vessel (not shown) and liquid still containing entrained bubbles is drawn from the vessel via outlet vent purge port 42 and is returned (recycled) to the supply vessel. Debubbled liquid is discharged from the outlet conduit 18. The limit of effectiveness is seen to be when the incoming bubble load is sufficiently great that some bubbles escape being swept upwards by the "ultrasonic wind" emanating from the upper end of the horn 22 and are undesirably carried out of the vessel 11 through outlet port 17, resulting in bubble detector activity in a bubble detector (not shown) downstream of outlet port 17.

RF generator 36 is of a type, such as is disclosed, for example, in reference U.S. Pat. No. 3,432,691, which is capable of being operated at the parallel resonant frequency of the transducers, preferably at about 40 kHz. A suitable generator is Model 40K351G120, available from Dukane Corp., St. Charles, Ill.

Operation of RF generator 36 may be controlled manually by a human operator or, preferably, by predetermined signals from, and status response signals to, computer 38 to guide the debubbling apparatus automatically through the various steps in accordance with a method of the invention.

It is critical to the method of the present invention to operate RF generator 36 at a constant output voltage. A key to such operation is that the tuning of the RF generator 36 be at or near the parallel resonant frequency of the piezoelectric crystals 28, 30. At this condition, the RF generator 36 automatically varies its power output to correctly account for load changes caused by changing conditions within debubbler apparatus 10, such as variations in viscosity, entrained bubble load, density of liquid composition, and presence or absence of fluid within the vessel 11.

Piezoelectric crystals 28, 30 preferably resonate nominally at about 40 kHz. There is a narrow range of frequencies in which the piezoelectric crystals 28, 30 are resonant, the actual frequencies being determined by individual transducer and RF generator characteristics, as is known in the art. The low end of the range is known as the series resonance and the high end is known as the parallel resonance. Prior art debubbling devices typically are operated for constant power output at the series resonance, wherein the generator is controlled (by adjusting the voltage) to provide a constant power output in the face of changing loads. This can be dangerous or damaging to the equipment such as, for example, if the debubbler vessel 11 is operated empty of liquid. Where the RF generator 36 is tuned to the parallel resonant frequency of the piezoelectric crystals 28, 30 and is operated at constant voltage, changes in load result in corresponding changes in power draw from the RF generator 36. Empty equipment cannot be damaged inadvertently. More importantly, the RF generator 36 automatically adjusts its output to meet whatever load is imposed upon it. Thus, as the ultrasonic demands of the liquid within the vessel 11 change because of changes in viscosity or density or bubble content, for example, between successive runs of different compositions through vessel 11, the power output of the RF generator 36 changes accordingly. Thus the RF generator 36, when properly calibrated as described below is always operating at maximum effectiveness and power efficiency.

In the practice of the method of the present invention, the vessel 11 of apparatus 10 is filled with deaerated high purity water, preferably at the temperature of the succeeding composition to be debubbled. Preferably, the deaerated high purity water is heated to a temperature that approximates the temperature of the liquid composition to be debubbled. At this time, the apparatus may or may not be coupled into a liquid composition delivery system. The frequency of the RF generator 36 is adjusted until a parallel or near-parallel resonant condition is established with the piezoelectric crystals 28, 30, via techniques known in the art. The term "near-parallel resonant condition" as used herein is intended to mean a frequency that is between the series resonant frequency and the parallel resonant frequency but is closer to the parallel resonant frequency than to the series resonant frequency. The frequency of RF generator 36 is then fixed. RF generators are known which are capable of automatically seeking a frequency that is near the parallel resonance frequency of a transducer and self-tuning themselves to it. After the RF generator 36 has been tuned, the system is calibrated. A pre-selected minimum or base power level for normal operation, preferably between about 20 watts and about 40 watts, is set by varying the voltage via the power output adjuster on the RF generator 36. The voltage is thus fixed at whatever voltage is required to provide the base power level. At parallel or near-parallel resonant frequency, this voltage will have minimal change with changes in ultrasonic load in the debubbler vessel 11. Although no subsequent adjustments are made to the voltage level, there can be slight changes in the voltage with changes in the ultrasonic load in debubbler vessel 11. Water is a relatively easy fluid to debubble because of its low viscosity, and therefore water calibration represents the lowest power output expected for the debubbling system. The voltage is fixed at the calibration level and the system is now ready for operation. The terms "fixed voltage" and "constant voltage", as used herein, are intended to mean that the voltage is set and not actively controlled thereafter although the voltage will likely vary in a relatively narrow operating band during operation of the apparatus. The amount of variation of the operating voltage will depend on how the load is changing.

Figure 4:
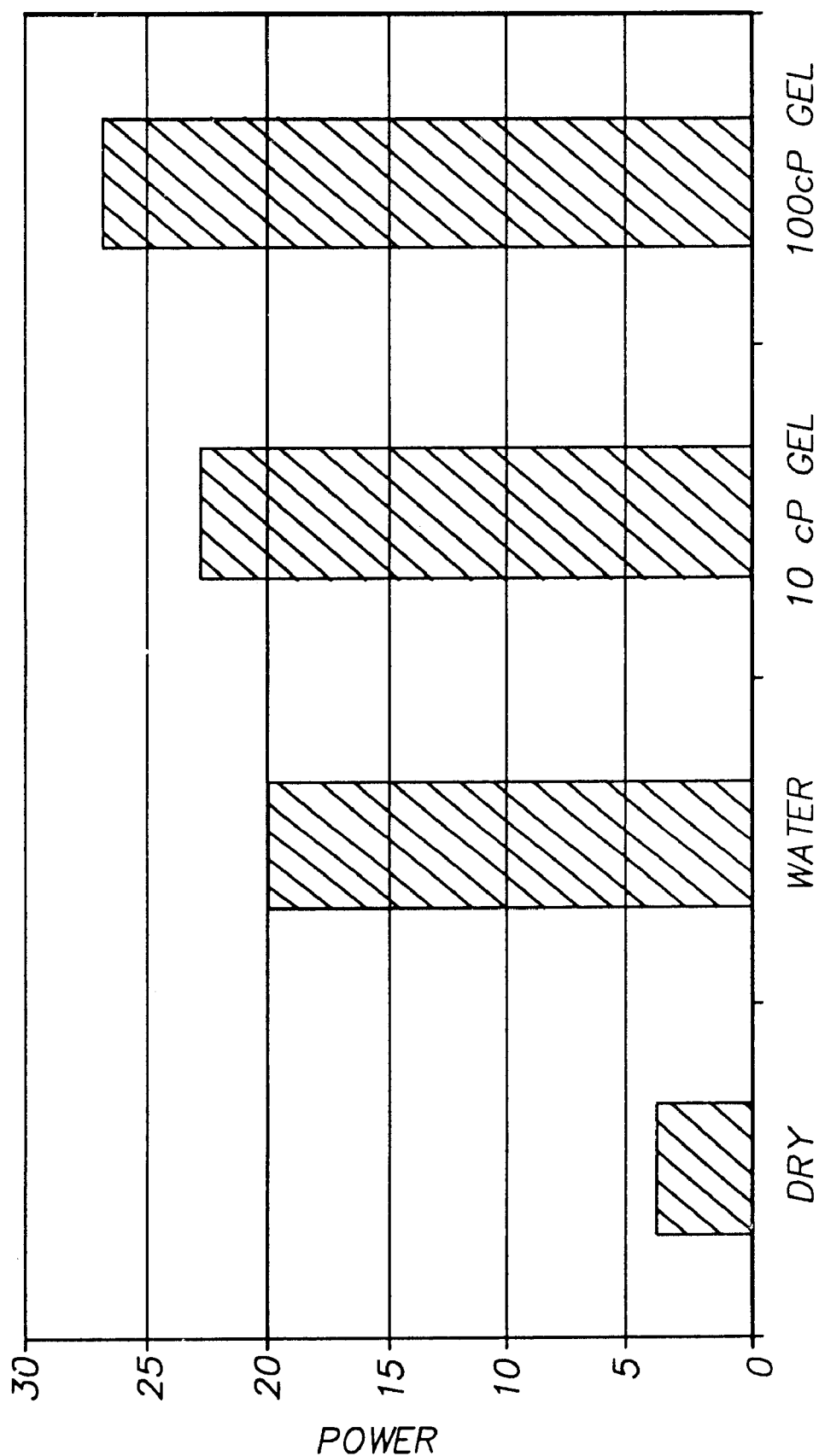
FIG. 4 is a histogram showing the automatic increase in power delivered to the transducer of an ultrasonic debubbler as a function of increased viscosity when calibrated and operated at constant voltage in accordance with the method of the present invention.

The vessel 11 is coupled into a composition delivery system (if not already so installed) and the water is displaced by composition flowing through the debubbler vessel 11. Photographic compositions to be treated may have viscosities as high as 500 cp. Because bubbles rise more slowly as viscosity increases, the bubble-free flow rate through outlet conduit 18 decreases with increasing viscosity of the composition (see curve 46 in FIG. 3). However, unlike prior art constant-power debubbler systems, the power supplied by RF generator 36, operating at a fixed-voltage, increases as viscosity increases, as shown in FIG. 4. Thus, as debubbling becomes more difficult, the system automatically provides more power to the composition flowing through vessel 11.

Figure 5:
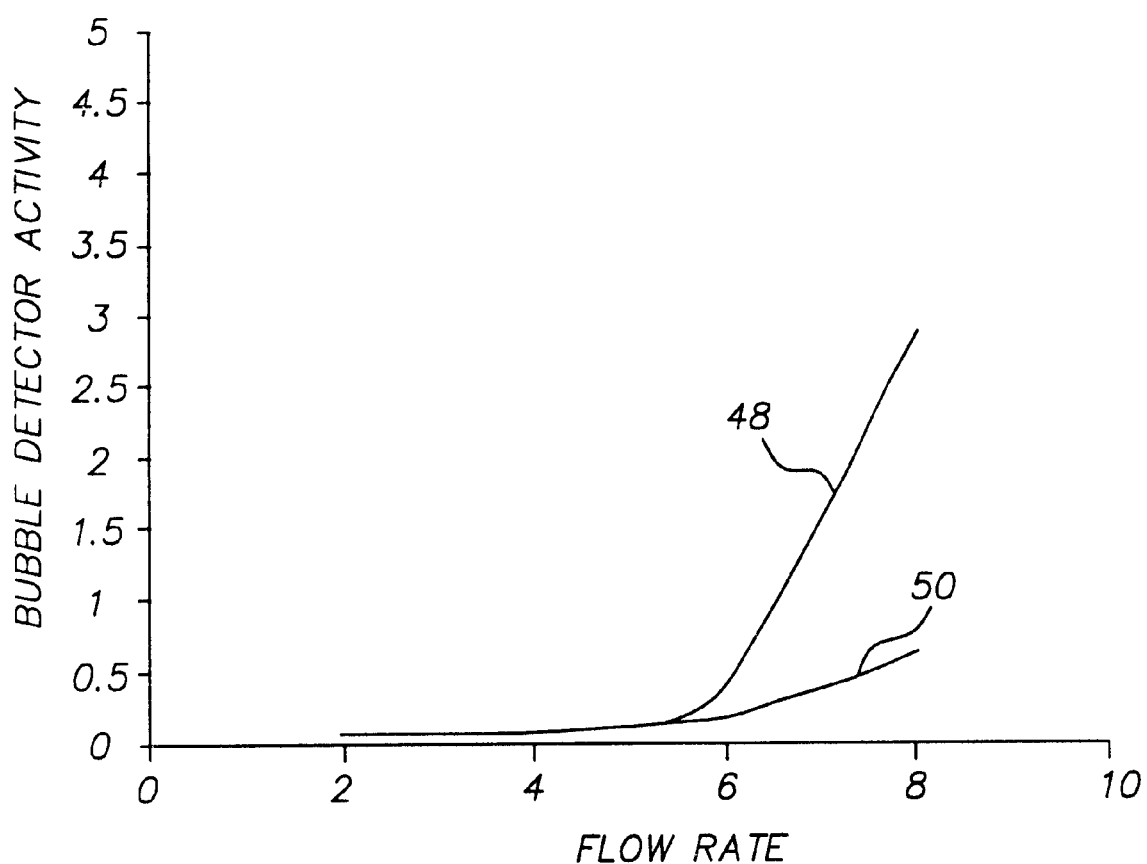
FIG. 5 is a graph showing the level of bubble detector activity downstream of an ultrasonic debubbler when operated in accordance with either the prior art method (constant power output) or the method of the present invention (constant voltage output).

FIG. 5 shows test results comparing debubbling effectiveness of a typical liquid composition, expressed as intensity of down-stream bubble-detector activity, when debubbled by the apparatus operated at constant power (prior art, curve 48) and at constant voltage (present invention, curve 50).

Bubbles coalesced and swept upwards in the vessel 11 by the "ultrasonic wind" emanating from the upper end of the horn 22 collect against the upper end wall 12 and, in an optional fourth step, may be purged from the vessel 11 through outlet vent purge port 42, either periodically or continuously, as desired.

From the foregoing it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST

Debubbling Apparatus
Cylindrical Vessel
Upper End Wall
Lower End Wall
Inlet Port Inlet Conduit
Outlet Port
Outlet Conduit
Device
Transducer Portion
Horn
Securing Bolt
End Mass
Piezoelectric Crystal
Piezoelectric Crystal
Contact Plate
End Mass
Signal Generator
Process Control Computer
Vent Purge Conduit
Outlet Vent Purge Port

What is claimed is:

1. A method for debubbling a liquid composition containing entrained gas bubbles comprising the steps of:
   (a) immersing a horn in water, the horn being contained within a vessel and coupled to at least two piezoelectric crystals;
   (b) tuning an RF generator connected to at least two piezoelectric crystals at a parallel or a near-parallel resonance frequency of at least two piezoelectric crystals;
   (c) setting the RF generator at a base power level by adjusting an output voltage level; and
   (d) flowing the liquid composition to be debubbled through the vessel with the RF generator operating at a constant voltage level and at a variable operating power level that varies with the viscosity of the liquid composition.

2. A method for debubbling a liquid composition containing entrained gas bubbles comprising the steps of:
   (a) immersing a horn in water, the horn being contained within a vessel and coupled to at least two piezoelectric crystals;
   (b) adjusting an RF generator connected to at least two piezoelectric crystals to produce a signal at or near a parallel resonance frequency of at least two piezoelectric crystals;
   (c) fixing the RF generator at a constant voltage level; and
   (d) flowing the liquid composition to be debubbled through the vessel with the RF generator operating at constant voltage level and at a variable operating power level that varies with the viscosity of the liquid composition.

3. A method as recited in claim 1 wherein:
   the immersing step is performed with water that has been previously degassed.

4. A method as recited in claim 1 further comprising the step of:
   heating the water prior to the immersing step to a temperature that approximates a temperature of the liquid composition during the flowing step.

5. A method as recited in claim 1 wherein:
   the parallel resonance frequency is about 40 kHz.

6. A method as recited in claim 1 wherein:
   the base power level is from about 20 to about 40 watts.

7. A method as recited in claim 1 wherein:
   setting the RF generator at the base power level is performed by fixing the output voltage level to yield the base output power level.

8. A method as recited in claim 2 wherein:
   the immersing step is performed with water that has been previously degassed.

9. A method as recited in claim 2 further comprising the step of:
   heating the water prior to the immersing step to a temperature that approximates a temperature of the liquid composition during the flowing step.

10. A method as recited in claim 2 wherein:
    the parallel resonance frequency is about 40 kHz.

11. A method as recited in claim 2 wherein:
    the base power level is from about 20 to about 40 watts.

* * * * *